Dec. 25, 1945.  R. D. KING ET AL  2,391,712
METHOD OF MAKING SELF-LOCKING NUTS
Filed Nov. 15, 1943  2 Sheets-Sheet 1
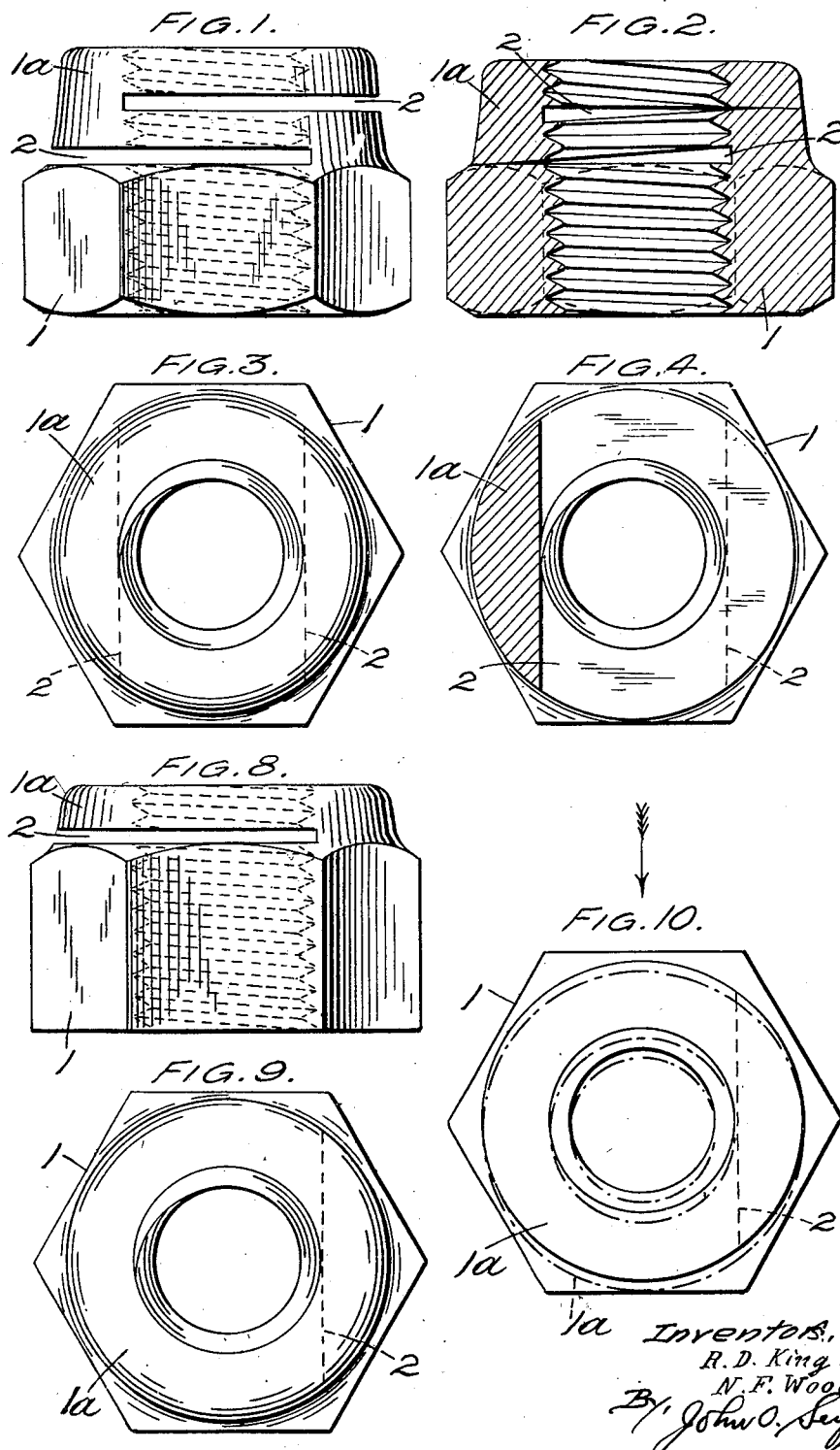

Inventors,
R. D. King &
N. F. Wood
By John O. Seifert
Atty.

Patented Dec. 25, 1945

2,391,712

UNITED STATES PATENT OFFICE 2,391,712

METHOD OF MAKING SELF-LOCKING NUTS

Ronald D. King and Norman F. Wood,
Portsmouth, England

Application November 15, 1943, Serial No. 510,270
In Great Britain December 15, 1942

5 Claims. (Cl. 10—86)

This invention relates to self-locking or "stiff" nuts, that is to say to nuts which bind tightly on the bolt and are in no danger of coming loose as a result of vibration and like causes.

The object of the invention is the provision of an improved nut of this kind, and the invention consists of a self-locking or stiff nut consisting of a nut with a slot cut transversely into it relatively near to one end, said slot extending sufficiently far to cut right through the tapped hole or nearly so, and the metal being distorted, whereby the screw threads on the two sides of the slot are out of their correct relative correlation.

In a preferred arrangement there are two of such slots relatively near to the one end of the nut, said slots being diametrically opposite and in different planes so that they overlap.

The invention further comprises a method of cutting slots into the tapped holes of nuts and distorting the metal whereby the screw threads on the two sides of the slots are out of their correct relative correlation, which comprises continuously conveying a series of nuts, by means of a conveyer first past a suitable cutter or cutters whereby the slots are cut and then past a pressure roller whereby the metal is distorted.

In order that the invention may be the more clearly understood, examples of nuts in accordance therewith and their method of production will now be described, reference being made to the accompanying drawings, wherein:

Figure 1 is a side elevation of one of said nuts before being distorted to its final state;

Figure 2 is a sectional side elevation of the same after being distorted to its final state;

Figure 3 is a plan of either of Figures 1 or 2;

Figure 4 is a sectional plan of the same taken in the plane of the upper of the two slots;

Figures 8 and 9 are similar views to Figures 1 and 3 of another of said nuts;

Figure 10 is a plan illustrating in an exaggerated manner a different way in which the metal of the nut of Figures 8 and 9 can be distorted.

Referring first to Figures 1 to 4, the nut 1 has its diameter reduced at one end by turning down on a lathe. In the reduced end 1a so formed two saw cuts 2 are made at right angles to the axis of the nut. These cuts 2 are made at diametrically opposite points but in different planes and each one is continued well beyond the axis of the nut and until it has cut right through the tapped hole of the nut. The nut is then compressed until the saw cuts 2 are closed as shown in Figure 2, and it is found that the nut will grip the threads of the bolt in such a way that it will not come inadvertently loose. The nut can be used repeatedly a large number of times without loosening on the bolt.

In practice one of the two saw cuts 2 is at the root of the reduced portion 1a where the latter joins the main part of the nut. The other is mid-way between this and the outer end of the said reduced portion. The two saw cuts 2 extend just through the tapped hole of the nut so as to reach the tangent line to the base of the screw threads as shown. It is preferred to make the reduced end 1a of the nut not strictly cylindrical but slightly coned as shown. At its root the reduced end portion may be reduced only just sufficiently to get a complete circular section. Obviously the particular dimensions can be varied indefinitely. In the nut illustrated in Figures 1 to 4 the axial length of the nut was .354" to .340"; the diameter across faces was .440" to .445", and the length turned down was .144" to .146". The width of the saw cuts was .019" to .020".

Figure 5:
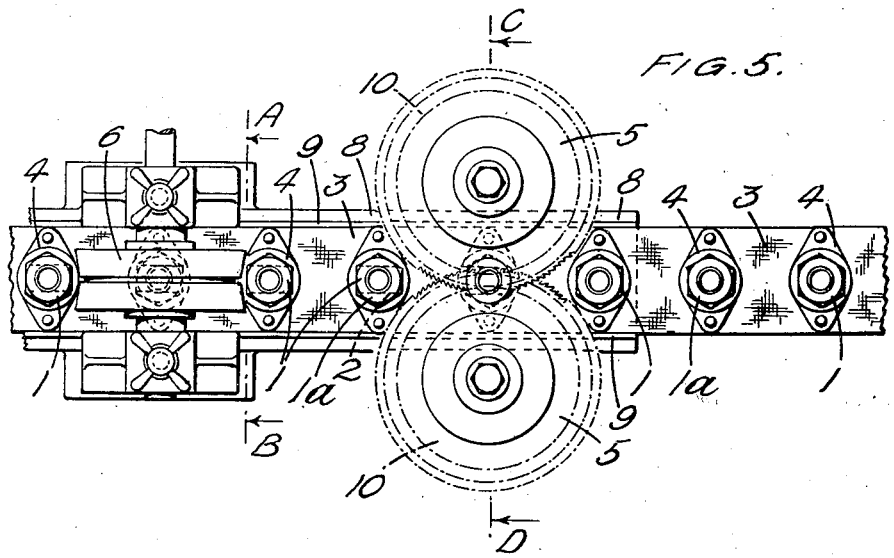
Figure 5 is a plan of the apparatus by which the slots are formed and closed.
Figure 6:
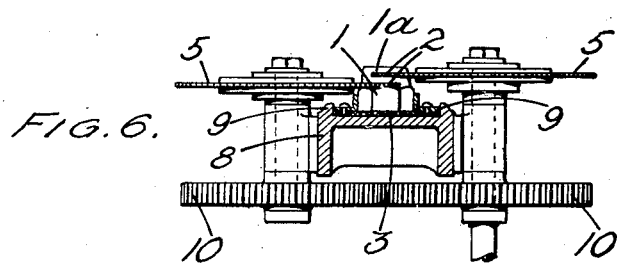
Figure 6 is a section on line C—D of Figure 5.
Figure 7:
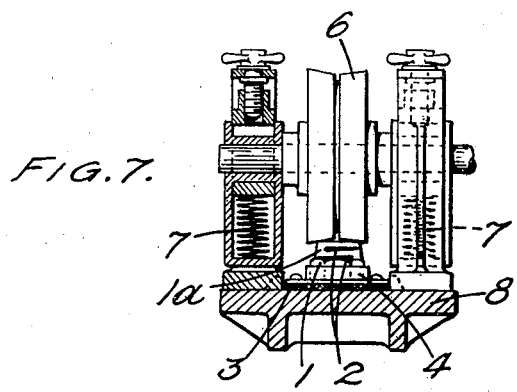
Figure 7 is a section on line A—B of Figure 5.

Referring to Figures 5, 6 and 7 which illustrate the apparatus by which the slots 2 are formed and closed by mass production methods, these figures show a horizontal conveyer 3 of the chain type fitted, on its upper surface, with a number of spaced hexagonal holders 4 into which the nuts 1 fit with their reduced ends 1a projecting upwardly. This conveyer 3 continuously conveys the nuts successively between two horizontally mounted milling cutters 5 arranged with one on each side of the procession of nut and carefully located and adjusted so that in each nut they form the two opposite saw cuts 2 simultaneously in a manner which will be clear from the drawings. After having passed between the milling cutters 5 the nuts are conveyed by the conveyer 3 underneath a pressure roller 6 which is rotatable about an axis transverse to the path of movement of the nuts. This roller 6 is adjusted to such a vertical position that the nuts in passing beneath it have their slots closed. The roller is capable of being lifted slightly from this said vertical position in opposition to springs 7 which are too strong to permit of the roller being lifted until the slots are closed, but which are not strong enough to cause any crushing of the metal of the nut after the slots are closed. Thus as each nut passes under the roller the slots are first closed after which the roller is slightly lifted. This arrangement ensures that the nuts shall be fully closed without any danger that the metal of the nut shall be unduly stressed. As shown the periphery of the roller is slightly bevelled inwardly towards its centre plane so that the top of the reduced end 1a of each nut is engaged at the appropriate places for closing of the slots.

As shown, the milling cutters 5 and the roller 6 are supported from a fixed base 8 having a horizontal upper guide surface over which said conveyer 3 slides. This guide surface has side flanges 9 on each side of the conveyer which ensure that the nuts are correctly located in relation to the milling cutters. This base 8 is shown stronger at the region beneath the roller 6 to enable it to withstand the pressure of the roller on the nuts.

The milling cutters 5 are made as shown relatively thick except for the marginal portion near the cutting edge which actually enters the slots 2. Thus, although the slots are narrow the milling cutters are relatively rigid.

The reference 10 designates gear wheels by which the milling cutters are geared together to rotate in opposite directions. Other details will be clear from the drawings.

It will be appreciated that the method by which the slots are cut and closed can be varied from that particularly described and illustrated.

Referring to Figures 8 and 9 these show a modification in which there is only one saw cut 2 instead of two, in the reduced end portion 1a of the nut. This is at the root of the reduced portion where it joins the main part of the nut. This enables the reduced portion to be considerably shallower, which again allows the whole nut to be shallower. As in the preceding figures, this saw cut is continued to the tangent line to the base of the screw threads.

In the nut of Figures 8 and 9 the one saw cut 2 can be cut and closed in essentially the same way as the two saw cuts 2 of the preceding figures, as will be clear to those skilled in the art.

Referring to Figure 10 this illustrates a different way in which the nut of Figures 8 and 9 could be distorted to make the screw threads on the two sides of the slot out of their correct relative correlation. Thus in this figure instead of the slot 2 being closed the metal above it is forced sideways by a force (indicated by the arrow) transverse to the axis of the nut and transverse to the direction in which slot was cut into the nut. This produces a permanent set, forcing the metal above the slot to take up a position which is shown much exaggerated in dotted lines in Figure 10, such that the screw threads above the slot are eccentric with respect to those below the slot. Thus upon the nut being screwed on to the bolt, where it engages the tapped portion above the slot, the metal above the slot will be strained back towards the normal position and a strong friction drag will accordingly be produced.

Obviously the same form of distortion could be applied where there are two slots as in Figure 1. In this case the metal above the lower slot could be distorted sideways in one direction and the metal above the upper slot could be distorted sideways in the other direction.

Obviously again the sideways distortion could be employed in combination with the closure of the slot and slots.

It will be appreciated that the invention can be varied in a variety of ways without departing from the scope of the appended claims. For instance there could be more than two slots in the reduced end portion, all of them being in different planes and cutting through the tapped hole as above described. Again the reducing of the end could be dispensed with the slot or slots being formed straight into the hexagon section nut but relatively near to one end.

We claim:

1. A method of cutting slots transversely into the screw threaded openings of nuts and distorting the material of the nuts to position the screw threads adjacent to the slots out of their correct relative correlation, which comprises continuously conveying a series of nuts in a horizontal plane, cutting slots through one side of the nuts to the tangent line to the base of the screw threads farthest from the open end of the slots during the continuous travel of the nuts, and then applying pressure above the open end of the slots to effect closing movement of the slots during the continuous travel of the nuts.

2. A method of cutting a pair of diametrically opposite slots transversely into the screw threaded openings of nuts and distorting the material of the nuts to position the screw threads above the slots out of their correct relative correlation, which comprises continuously conveying a series of nuts in a horizontal plane, simultaneously cutting slots from diametrically opposite sides of a nut in different horizontal planes to the tangent line to the bases of the screw threads farthest from the open ends of the slots, and then simultaneously applying pressure above the open ends of the slots to effect closing movement of the slots, the cutting and pressure applying operations being performed during the continuous travel of the nuts.

3. A method of cutting slots transversely into the screw threaded openings of nuts and distorting the material of the nuts to position the screw threads adjacent to the slots out of their correct relative correlation, which comprises continuously conveying a series of nuts in a fixed plane, cutting slots through one side of the nuts during the continuous travel of the nuts, and then applying pressure above the open end of the slots to effect closing movement of the slots during the continuous travel of the nuts.

4. A method of cutting a pair of diametrically opposite slots transversely into the screw threaded openings of nuts and distorting the material of the nuts to position the screw threads above the slots out of their correct relative correlation, which comprises continuously conveying a series of nuts in a fixed plane, simultaneously cutting slots from diametrically opposite sides of a nut in different planes, and then simultaneously applying pressure above the open ends of the slots to effect closing movement of the slots, the cutting and pressure applying operations being performed during the continuous travel of the nuts.

5. A method of distorting the material of nuts having transverse slots cut into their screw threaded openings to position the screw threads on opposite sides of the slots out of their correct relative correlation, which comprises continuously conveying a series of slotted nuts in a given path, and applying pressure above the open end of the slots to effect closing movement of the slots during and by virtue of the continuous travel of the nuts.

RONALD D. KING.
NORMAN F. WOOD.